United States Patent
Fadeev et al.

(10) Patent No.: US 9,667,437 B2
(45) Date of Patent: May 30, 2017

(54) BILLING MULTIPLE PACKET FLOWS ASSOCIATED WITH A CLIENT ROUTER

(71) Applicant: Verizon Patent and Licensing Inc., Arlington, VA (US)

(72) Inventors: Alexander Fadeev, Basking Ridge, NJ (US); John Antypas, III, Walnut Creek, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 238 days.

(21) Appl. No.: 14/521,512

(22) Filed: Oct. 23, 2014

(65) Prior Publication Data

US 2016/0119163 A1    Apr. 28, 2016

(51) Int. Cl.
  *H04L 12/46* (2006.01)
  *H04L 12/28* (2006.01)
  (Continued)

(52) U.S. Cl.
  CPC .......... *H04L 12/46* (2013.01); *H04L 12/2856* (2013.01); *H04L 12/6418* (2013.01);
  (Continued)

(58) Field of Classification Search
  CPC ..... H04L 12/6418; H04L 12/46; H04L 12/66; H04L 67/12; H04L 12/2856; H04L 45/741; H04L 12/14; H04L 12/1403; H04L 12/1407; H04L 12/1425; H04M 15/12; H04M 15/00; H04M 15/16; H04M 15/38; H04M 15/49; H04M 15/61; H04M 15/63; H04M 15/66; H04M 15/68;
  (Continued)

(56) References Cited

U.S. PATENT DOCUMENTS

2004/0193712 A1 *   9/2004   Benenati ............. H04L 63/0815
                                                   709/225
2004/0267645 A1 *  12/2004   Pollari .................... G06F 21/10
                                                   705/34

(Continued)

OTHER PUBLICATIONS

S. Deering and R. Hinden, "Request for Comments 2460" Dec. 1998 p. 24.*

(Continued)

*Primary Examiner* — Mark Rinehart
*Assistant Examiner* — Kenneth P Hunt

(57) ABSTRACT

A method includes receiving at a network device, an identifier from a vehicle routing device. The vehicle routing device is configured to identify packet data flows based on an application running on a vehicle client device. The packet data flows are flowing over a communication link between the vehicle routing device and the vehicle client device. The method includes identifying each packet of each flow according to the application that sends or receives packets related to each of the packet data flows, determining an extended header for the one or more packet data flows based on an Internet protocol version 6 (IPv6) extension header and a RADIUS vendor specific attributes (VSA) structure, and transmitting, by the vehicle routing device, to the network device, the extended header and the one or more packet data flows.

19 Claims, 17 Drawing Sheets

(51) Int. Cl.
*H04L 12/66* (2006.01)
*H04L 29/08* (2006.01)
*H04M 15/12* (2006.01)
*H04L 12/64* (2006.01)
*H04L 12/749* (2013.01)
*H04L 12/725* (2013.01)
*H04L 12/721* (2013.01)

(52) U.S. Cl.
CPC .............. *H04L 12/66* (2013.01); *H04L 67/12* (2013.01); *H04M 15/12* (2013.01); *H04L 45/306* (2013.01); *H04L 45/38* (2013.01); *H04L 45/741* (2013.01)

(58) Field of Classification Search
CPC ...... H04M 15/8214–15/8242; H04M 2215/01; H04M 2215/46; H04M 2215/56; H04W 4/24; H04W 4/26
USPC .......................... 370/328; 455/406, 407, 408; 379/114.01, 114.02, 114.03, 114.05, 379/114.06, 114.08, 114.28
See application file for complete search history.

(56) References Cited

U.S. PATENT DOCUMENTS

| | | | | |
|---|---|---|---|---|
| 2008/0159288 | A1* | 7/2008 | Nagarajan | H04L 45/10 370/392 |
| 2010/0128665 | A1* | 5/2010 | Kahn | H04L 45/304 370/328 |
| 2011/0228744 | A1* | 9/2011 | Cai | H04W 36/0033 370/331 |
| 2011/0270722 | A1* | 11/2011 | Cai | G06Q 30/0283 705/34 |
| 2012/0020241 | A1* | 1/2012 | Nguyen | H04L 1/1692 370/252 |
| 2013/0301584 | A1* | 11/2013 | Addepalli | H04W 4/046 370/329 |
| 2013/0322626 | A1* | 12/2013 | Yang | H04L 63/123 380/255 |
| 2014/0122727 | A1* | 5/2014 | Miner | H04L 67/12 709/227 |

OTHER PUBLICATIONS

C. Rigney S. Willens A. Ruben W. Simpson "Request for Comments 2865" Jun. 2000 pp. 2, 14, 23 and 47-48.*
M. Chiba G. Dommety M. Eklund D. Mitton B. Aboba "Request for Comments 5176" Jan. 2008.*
B. Carpenter S. Jiang "Request for Comments 7045" Dec. 2013, p. 7.*

* cited by examiner

| | FLOW DIRECTION 405 | SOURCE IP 410 | SOURCE PORT RANGE 415 | DESTINATION IP 420 | DESTINATION PORT RANGE 425 | PROTOCOL 430 | ATTRIBUTES 435 |
|---|---|---|---|---|---|---|---|
| 1 | OUT | 192.168.0.1/32 | ANY | ANY | 80, 443 | TCP | ID=5 POL=WEB |
| 2 | OUT | 192.168.0.1/32 | ANY | ANY | 80, 443 | TCP | ID=6 POL=WEB |
| 3 | OUT | 192.168.0.1/32 | ANY | ANY | 5060 | UDP | ID=9 POL=VOIP |
| 4 | IN | ANY | 5060 | 192.168.1.1/32 | ANY | UDP | ID=9 POL=VOIP |
| 5 | DEFAULT | ANY | ANY | ANY | ANY | TCP UDP | ID=0 POL=DEFLT |

| Flags | Ticket | Company ID | Sub Command ID | Command String | Type Code | Length | Opaque Data |
|---|---|---|---|---|---|---|---|
| 16-bits | 32-bits | 32-bits | 32-bits | String | 8-bitgs | 16-bits | .... |

| 15 | 4 | 3 | 2 | 1 | 0 |
|---|---|---|---|---|---|
| Bits are not used | | C | N | F1 | F2 |

| Field | Meaning | | |
|---|---|---|---|
| Flags | A unique bit field which tells each network node how to process this extended packet -- four bits are used | | |
| | FORWARD (F1, F2) | 2 bits with the following states | |
| | | 00 | Do not forward this packet -- remove it after processing |
| | | 01 | Forward this packet if processing succeeds |
| | | 10 | Forward this packet if processing fails |
| | | 11 | Unconditionally forward this packet |
| | NOTIFY (N) | Notify the source node on failure | |
| | CORRECT (C) | If set, correct the packet on failure and try again | |
| Ticket | A unique 32-bit value that can be used to correlate commands and responses between nodes | | |
| Company ID | A unique 32-bit ID the IETF will assign to a given company. This is analogous to the VSA Company ID | | |
| Sub Command ID | A second unique 32-bit ID which a given company can use to sub-divide its command space. | | |
| Command String | A string value that defines the command | | |
| Type | An 8-bit type code analogous to the VSA type code. | | |
| Length | A 16-bit length value that indicates the size of the opaque data | | |
| Opaque Data | The value of the data | | |

910 — Flags row
912 — Ticket
914 — Company ID
916 — Sub Command ID
918 — Command String
920 — Type
922 — Length
924 — Opaque Data

FIG. 9C

| Direction 1110 | Source IP 1120 | Source Ports 1130 | Destination IP 1140 | Destination Ports 1150 | Protocol 1160 | Extended Header VSAs 1170 |
|---|---|---|---|---|---|---|
| Outbound | 192.168.0.1-15 | Any | Any | 80,443 | TCP | (CompanyID=Verizon<br>SubCommandID=Verizon-Wireless<br>CommandString= SetBillingCode<br>Type=Integer<br>Value=5<br>Flags= CORRECT,FORWARD=0) |
| Outbound | 192.168.0.17-31 | Any | Any | 80,443 | TCP | (CompanyID=Verizon<br>SubCommandID=Service Provider Wireless<br>CommandString= SetBillingCode<br>Type=Integer<br>Value=9<br>Flags= CORRECT,FORWARD=0, NOTIFY) |
| Default | Any | Any | Any | Any | Any | (CompanyID=Verizon<br>SubCommandID=Service Provider Wireless<br>CommandString= SetBillingCode<br>Type=Integer<br>Value=0<br>Flags= CORRECT,FORWARD=0) |

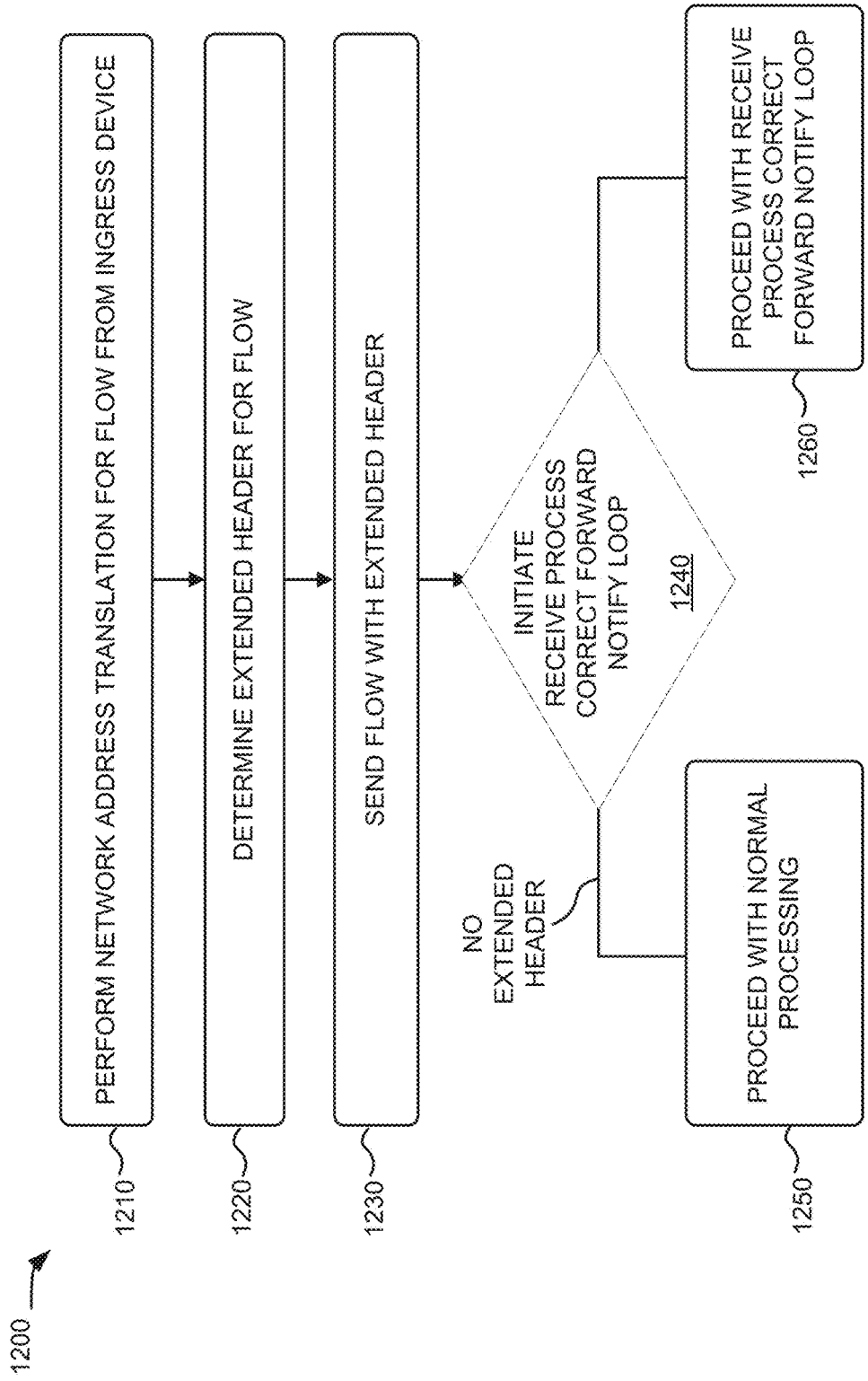

| EH-Type = VSA<br>Company ID = SERVICE PROVIDER<br>Sub Command ID = SP WIRELESS<br>Command String = SetBillingID<br>Type = Integer<br>Flags = FORWARD=0, CORRECT, NOTIFY<br>~ 1310 | If this VSA is sent, a Service Provider packet gateway will expect a Billing ID and will bill any packets this header is attached to on this ID. On failure, correct the billing ID and notify the source of this ID. Once processing is complete, remove this extended header<br>~ 1320 |
|---|---|

| Extended Header Type | Extended Header Length | Flags | Ticket | Company ID | Sub Command ID | Command String | Type | Length | Value |
|---|---|---|---|---|---|---|---|---|---|
| 26 | 5 | 0x000C | 9921 | 23001 | 1 | "SetBillingID" | Integer | 4 | 5 |

| Extended Header Type | Extended Header Length | Flags | Ticket | Company ID | Sub Command ID | Command String | Type | Length | Value |
|---|---|---|---|---|---|---|---|---|---|
| 26 | 5 | 0x000C | 9921 | 0 | 0 | "CorrectedBillingID" | Integer | 5 | 5 |

| Flags=FORWARD_UNCONDITIONAL | CompanyID=TrafficService<br>SubCompany=Updates<br>Command=UpdatePosition<br>Type=String<br>Length=## | "{<br>VIN=0041945003,<br>GPSPOS=135.21,99.54,<br>Speed=58 MPH<br>}" |
|---|---|---|

| Flags=FORWARD_UNCONDITIONAL | CompanyID=TrafficService<br>SubCompany=Updates<br>Command=TrafficAlert<br>Type=String<br>Length=## | "{<br>VIN=0041945003,<br>GPSPOS=135.21,99.54,<br>CongestionForNextMiles=3<br>}" |
|---|---|---|

FIG. 16B

BILLING MULTIPLE PACKET FLOWS ASSOCIATED WITH A CLIENT ROUTER

BACKGROUND INFORMATION

Carriers, which may include mobile, terrestrial, fixed-line etc., deliver data services based on a traditional "all you can eat" model, in which data is charged at a flat rate, and, increasingly, based on one or more segmented models, in which some traffic from a given device may be divided into multiple data sub-sessions billed to multiple financially responsible parties for a given time period. In the segmented models, some data flows may be subjected to special billing arrangements, some data flows may receive special traffic prioritization or treatment, and some data flows may be subject to encryption etc.

In some instances, network providers may convey special instructions regarding the handling of these traffic flows via a series of limited interfaces imbedded into Internet Protocol version 4 (IPv4) or IPv6 protocols. In other instances, the network providers may infer actions by inspecting traffic flows, often via deep packet inspection. Deep packet inspection, however, has limits and drawbacks such as high implementation and scaling costs.

BRIEF DESCRIPTION OF THE DRAWINGS

FIG. 4 is an exemplary routing configuration table;

FIGS. 9A, 9B and 9C depict, respectively, an exemplary extended header, a flag bit key table for the extended header and a field definition table for the extender header;

FIG. 11 depicts a routing table for packets with extended headers;

FIG. 12 is a flowchart of an exemplary process for processing a packet flow with an extended header according to an implementation described herein;

FIG. 13 depicts an extended header vendor specific attributes (VSA) table;

FIGS. 14A and 14B depict, respectively, an extended header for a packet flow and a corrected extended header;

FIGS. 16A and 16B depict, respectively, an extended header for a packet flow and a corrected extended header.

DETAILED DESCRIPTION OF PREFERRED EMBODIMENTS

The following detailed description refers to the accompanying drawings. The same reference numbers in different drawings identify the same or similar elements.

Embodiments described herein relate to devices, methods, and systems for billing multiple packet flows associated with same client router to different accounts. The systems and methods may allow an edge node in a mobile network, such as a mobile node, to communicate through the network information regarding the handling of particular packet data flows that are received at the client router from different client devices, applications and other sources. The systems and methods may allow the client router to communicate how the traffic is to be billed and how the traffic is to be groomed.

Consistent with embodiments, the systems and methods may identify, at a vehicle device (or router) in a vehicle, packet data flows based on particular data session characteristics. The packet flows may be transmitted over a communication link between the vehicle device and one or more client devices within or otherwise associated with the vehicle (e.g., belonging to a vehicle owner or family, etc.). The vehicle device may transmit, to a network device remote from the vehicle, one or more identifiers corresponding to each of the packet flows associated with one or more corresponding billing categories or profiles.

Consistent with embodiments, a billing system may process the usage records and generate billing information associated with the vehicle device according to one or more billing categories corresponding to the packet data flows that flow over a communication link between the vehicle device and the one or more client devices during a period.

Figure 1:
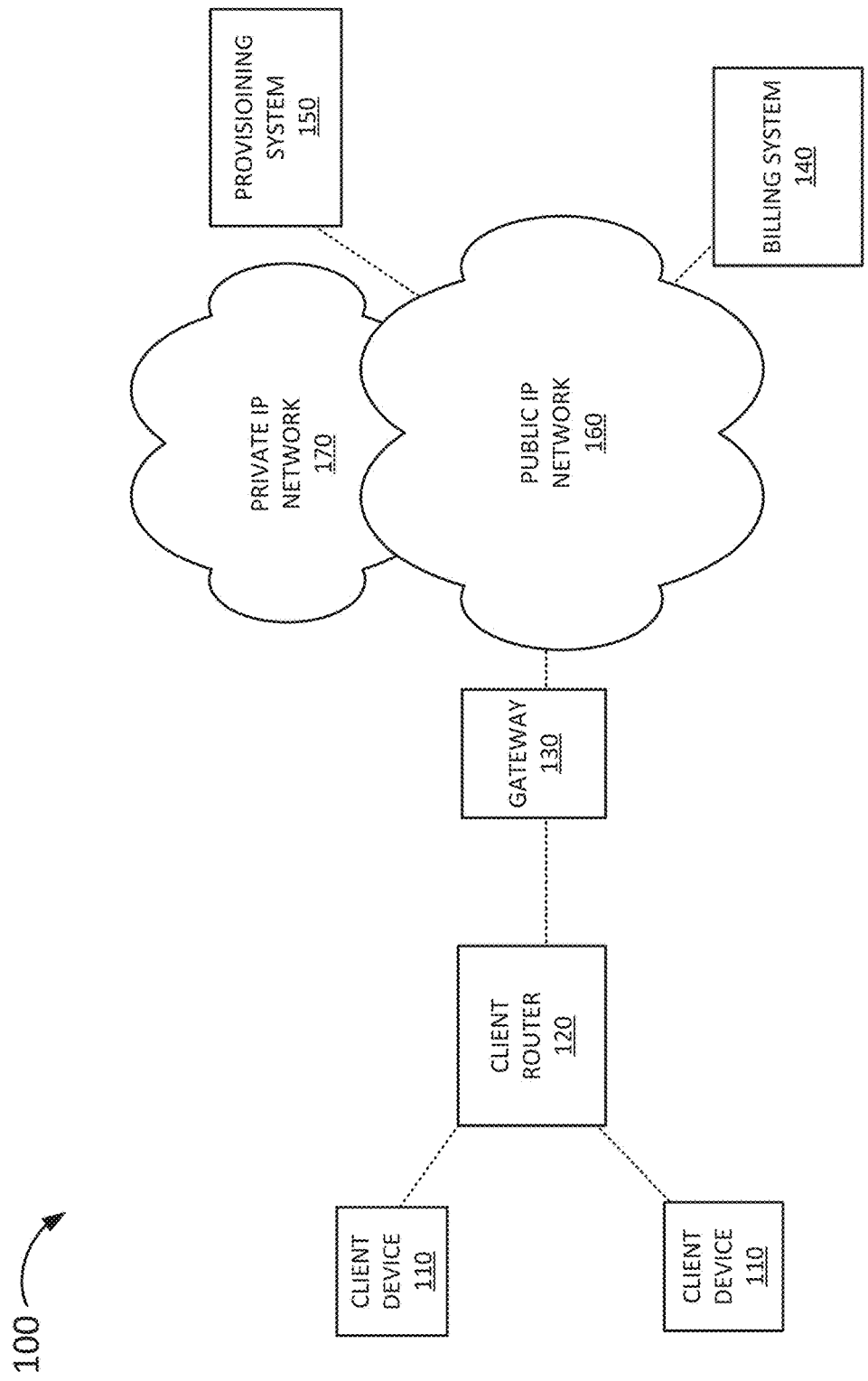
FIG. 1 depicts an exemplary network in which systems and methods described herein may be implemented.

FIG. 1 is a diagram of an environment 100 in which the systems and/or methods described herein may be implemented. As shown in FIG. 1, environment 100 may include client devices 110a-110m (herein "client device 110" or "client devices 110"), a client router 120, a gateway 130, a billing system 140, a provisioning system 150, a public Internet protocol (IP) network 160, and a private IP network 170. While FIG. 1 shows two client devices 110, a single client router 120, a single gateway 130, a single billing system 140, a single provisioning system 150, a single public IP network 160, and a single private IP network 170 for illustrative purposes, in practice, environment 100 may include additional client devices 110, client routers 120, gateways 130, billing systems 140, provisioning systems 150, multiple public IP network 160, and/or multiple private IP networks 170.

Client devices 110 may include devices that generate packet flows that are communicated through client router 120. One or more client devices 110 may be associated with a single client router 120. Each client device 110 may generate multiple data patterns or packet data flows that are to be billed separately. For example, client devices 110 may include devices within a network associated with an automobile, such as an engine measurement computer, navigation devices, radio devices, Wi-Fi hotspots, etc. Each client device 110 may generate completely separate data streams and patterns, which may all be aggregated at a long term evolution (LTE) antenna for all communication channels. In a further example, the client devices 110 may include customer and enterprise devices associated with a storefront that access a network through an LTE based router.

Client router 120 may include a routing entity such as an office or home routers, vehicle telematics units, etc. Client router 120 may control and/or support two-way communications with devices in other networks and inform the receiving networks that traffic data flows issuing from the client router are to be subjected to predetermined grooming (e.g. specialized billing), such as described herein below with respect to FIG. 3. For example, client router 120 may support communications with billing system 140 and/or provisioning system 150. Client router 120 may receive grooming parameters, such as billing IDs, from provisioning system 150. Client router 120 may perform network address and port translation (NAPT) or network address translation (NAT) for establishing communications (e.g., a voice over Internet Protocol (VoIP) connection, a diagnostic data stream, etc.) between a mobile device and a network. Client router 120 may receive traffic data flows from client devices 110 and assign a local or private address to the data flows. Client router 120 may use standard network address translation to combine packet data flows into a set of flows that can use a single, network provided IP address at the egress interface. Client router 120 may transmit the packet data flows from various client devices 110 in a manner that is obfuscated to external networks. Client router 120 may also transmit additional information via a communication channel that allows billing segmentation, usage segmentation, additional routing instructions, prioritization, etc.

Gateway 130 may include a communication gateway (e.g., transmission control protocol (TCP)/IP access gateway (fixed, mobile, etc.)), which accepts connections from client router 120, assigns addresses from the client connections, and routes the data flows to external networks such as the Internet, as described below with respect to FIG. 4. Gateway 130 may receive undifferentiated traffic from client devices 110. For example, gateway 130 may be unable to differentiate traffic flows past the vehicle router and consequently may be unable to determine from which client device 110 the constituent data flows that are included in the traffic flow received from client router 120 originates. Gateway 130 may provide connectivity of client router 120 to external packet data networks (e.g., to network 160) by being a traffic exit/entry point for client router 120 (and consequently client devices 110). Gateway 130 may perform policy enforcement, packet filtering for each user, charging support, lawful intercept, and packet screening. Gateway 130 may also act as an anchor for mobility between third generation partnership project (3GPP) and non-3GPP technologies.

Billing system 140 may include a network device that manages billing. For example, billing system 140 may generate bills to be provided to customers based on charging information (e.g., charging records, etc.). Billing system 140 may receive information via a communication channel from client router 120. The information may allow the network to bill for data flows associated with client devices 110 based on information client router 120 provides, as described below with respect to FIG. 6. Billing system 140 may interact with data flows from client router 120 based on the different customer client devices 110 (and sources of data flows) behind client router 120 that are to be billed separately or differently with respect to other data flows.

Provisioning system 150 may include a network device that provides provisioning information to client router 120 for various data flows associated with client devices 110, such as described herein below with respect to FIG. 7. Provisioning system 150 may provide provisioning data that informs client router that a customer (and associated data flows) is of a particular class. For example, provisioning system 150 may provide information identifying data flows for an infotainment service for a particular mobile data number (MDN). The data flows may be transmitted and received over a particular set of ports based on a particular port arrangement. This set of ports may then be billed to a particular account associated with the service (infotainment service in this example). Provisioning system 150 may provide an interface for providing available service options to customers allowing network operators to transfer down application rules regarding access to client router 120 and types of port arrangements and traffic tags for data flows that are to be applied.

Public IP network 160 may include a public IP packet-switched network, a circuit-switched network, or a combination thereof. For example, public IP network 160 may include a local area network (LAN), a wide area network (WAN), a metropolitan area network (MAN), an ad hoc network, an intranet, a fiber optic-based network (e.g., a fiber optic service network), a wireless network (e.g., a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof), and/or a combination of these or other types of networks.

Private IP network 170 may include a private IP packet-switched network, a private circuit-switched network, a wireless network, or a combination thereof.

Figure 2:
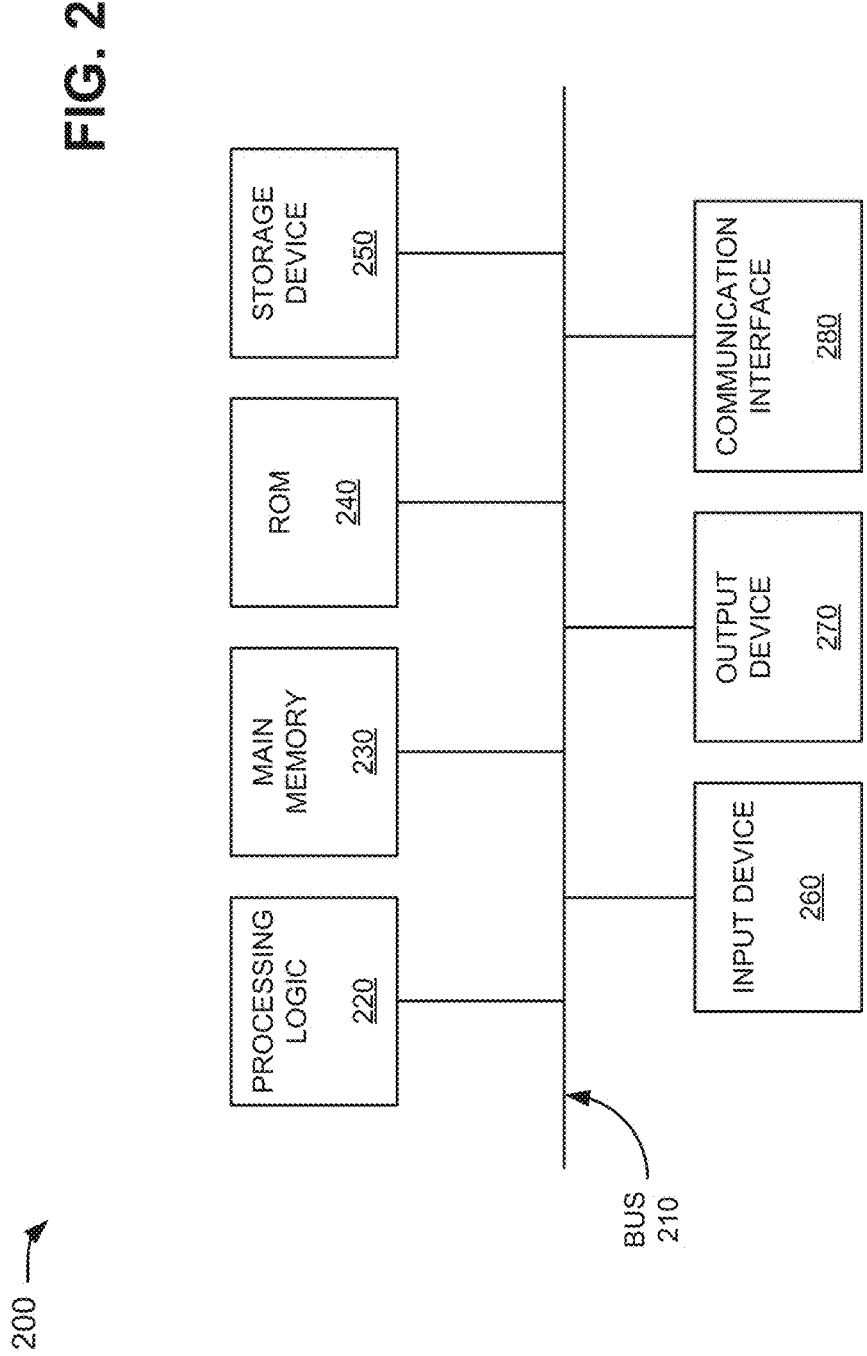
FIG. 2 is a block diagram of exemplary components of a device that may correspond to one of the devices of FIG. 1.

FIG. 2 is an exemplary diagram of a device 200 that may correspond to any of client device 110, client router 120, gateway 130, billing system 140 and/or provisioning system 150. As illustrated, device 200 may include a bus 210, processing logic 220, a main memory 230, a read-only memory (ROM) 240, a storage device 250, an input device 260, an output device 270, and a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control, etc. Output device 270 may include a mechanism that outputs information to the operator, including a display, a printer, a speaker, etc. Communication interface 280 may include a transceiver that enables device 200 to communicate with other devices and/or systems. For example, communication interface 280 may include mechanisms for communicating with another device or system via a network, such as network 160.

As described herein, device 200 may perform certain operations in response to processing logic 220 executing machine-readable instructions (i.e., software instructions) contained in a computer-readable medium, such as main memory 230. A computer-readable medium may be defined as a physical or logical memory device. The machine-readable instructions may be read into main memory 230 from another computer-readable medium, such as storage device 250, or from another device via communication interface 280. The machine-readable instructions contained in main memory 230 may cause processing logic 220 to perform processes described herein. Alternatively, hardwired circuitry may be used in place of, or in combination with, machine-readable instructions to implement processes described herein. Thus, implementations described herein are not limited to any specific combination of hardware devices, circuitry, and/or machine-readable instructions.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
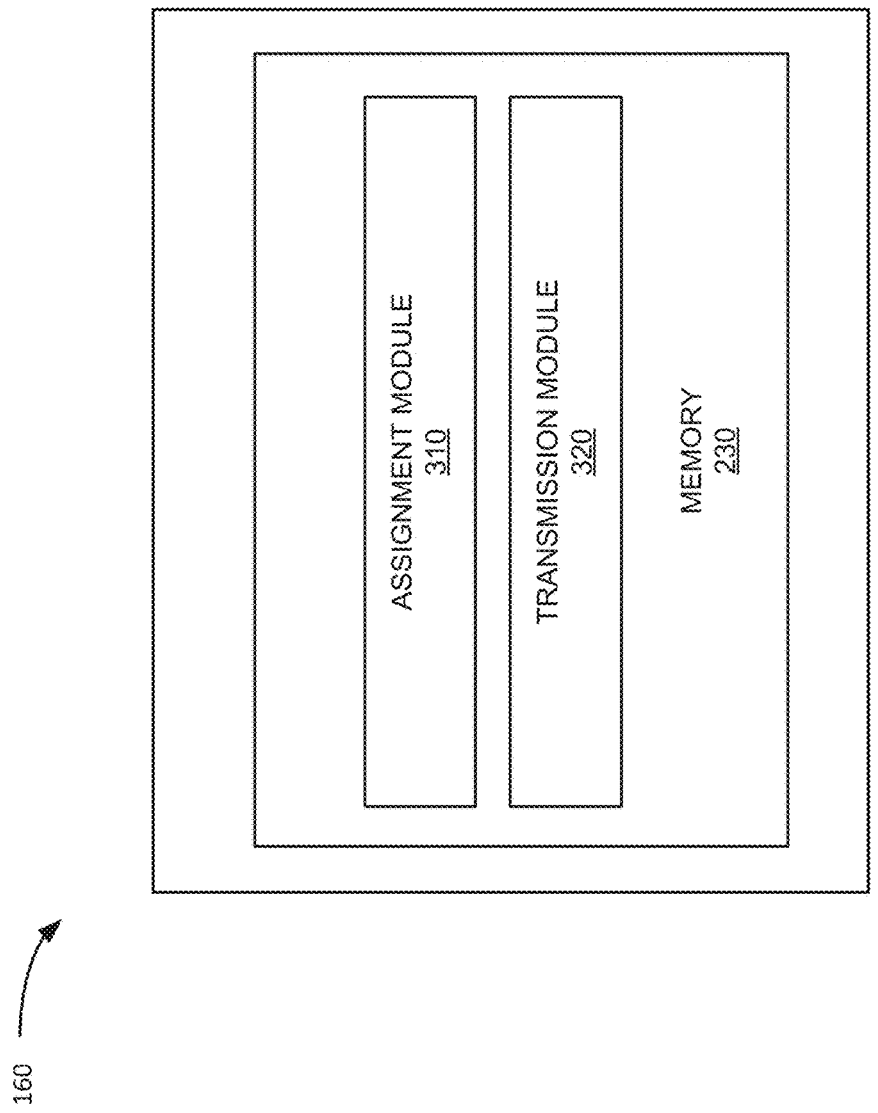
FIG. 3 is a functional block diagram of the client router of FIG. 1.

FIG. 3 is an exemplary functional block diagram of client router 120 according to an exemplary implementation. Client router 120 may include assignment module 310 and transmission module 320. The logical blocks illustrated in FIG. 3 may be implemented in machine-readable instructions, hardware, or a combination of hardware and machine-readable instructions. For example, in one implementation, all or some of the logical blocks illustrated in FIG. 3 may be implemented by processing logic 220 (FIG. 2) executing machine-readable instructions stored in, for example, memory 230. Functions associated with client router 120 are also described with respect to transmission table 400, illustrated in FIG. 4, and described herein below.

Assignment module 310 may monitor traffic data flows from various ingress sources For example, in an instance in which client router 120 is included as, or operatively coupled with, a telematics unit, assignment module 310 may receive data flows from, or to, client devices 110 in an automobile network, such as vehicle engine management computer, various dashboard computers and Wi-Fi hotspot (which may provide internet connectivity to myriad user devices within its range, such as, for example, multiple smartphones corresponding to multiple passengers in a vehicle). Assignment module 310 may receive and maintain information identifying the particular sources of data flows. For example, devices built into vehicle may use same traffic data flows from client router 120 to external networks. Wi-Fi connection may use same type of traffic but be subjected to a different billing arrangement. Identical traffic data flows may be subjected to different types of grooming based on the identities or types of client devices 110, entities and applications associated with the data flows. Assignment module 310 may communicate from egress side of client router 120 to gateway 130 and external network that this traffic data flow is proxied.

Assignment module 310 may apply a standard type of rule set and intentionally lay out egress traffic to known port ranges (e.g., assignment module 310 may lay out 5 tuple sets (i.e., an ordered list of five elements)) that may correspond to specific billing rules. According to an example, vehicle telematics control unit (TCU) (i.e., client router 120) may transmit particular data on dedicated source ports in which vehicle entertainment is assigned a particular range (e.g., 10,100 through 10,200), Wi-Fi may be assigned another range of ports (e.g., 10,100 to 10,200) and engine computers another range of ports, etc. Assignment module 310 may receive instructions to direct traffic based on billing rules and packet gateway 130 may be informed of the nature and treatment that is to be applied to data flows. Assignment module 310 may coordinate all interior traffic data flows for client devices 110.

Transmission module 320 may manage a communication channel to inform external networks how to treat the channel and how to bill for traffic flows on it. Transmission module 320 may format information identifying billing for data flows and provide the information to external networks and devices, such as billing system 140. Transmission module 320 may format the information in a configuration table, such as table 400, described with respect to FIG. 4 below. Transmission module 320 may transmit the configuration table that includes information to support specialized billing arrangements based on particular client devices 110 behind client router 120 that are using the traffic data flows.

FIG. 4 is an exemplary configuration table 400. Table 400 includes a flow direction 405, a source Internet protocol (IP) address 410, a source port range 415, a destination IP 420, a destination port range 425, a protocol 430 and attributes 435.

Client router 120 may receive and store configuration table 400. Client router 120 may implement access control to data flows based on configuration table 400 and may map data flows to corresponding attributes of the data flows.

Flow direction 405 indicates a direction of the data flows that are to be configured based on corresponding source IP 410 with respect to client router 120. The source IP 410 indicates a source IP address of a client device 110 that provides a particular data flow. Source port range 415 indicates a particular range of source ports to which a configuration rule applies. Destination IP 420 indicates a destination IP address of a particular data flow. Destination port range 425 indicates a particular range of destination ports to which a configuration rule applies. Protocol 430 indicates a transmission protocol for the data flow (e.g., TCP, user datagram protocol (UDP), voice over IP (VoIP), etc.). Attributes 435 may indicate a billing identifier (ID) and policy for the data flows.

As shown in the first row of table 400 (identified by reference numeral 1 in FIG. 4), any outbound flow (flow direction 405 out) from a source IP 410 of 192.168.0.1/32 on any port (i.e., source port range 415 is any port), to any address on port 80 or 443 (destination port range 425) using protocol 430 of TCP, is to be subjected to the web policy on gateway 130 and billed to billing ID 5. The web policy includes policies for billing and other handling of web traffic that are applied to web traffic.

As shown in the second row of table 400 (identified by reference numeral 2 in FIG. 4), any outbound flow from 192.168.1.1/32 on any port to any address on TCP port 80 or 443 is to be considered as part of (or governed by) the web policy and billed to billing ID 6.

As shown in the third row of table 400 (identified by reference numeral 3 in FIG. 4), any outbound traffic from 192.168.1.1/32 on any port to any address on UDP port 5060 is to be considered part of the VoIP traffic policy and billed to billing ID 9. The VoIP policy includes policy for billing and other handling of VoIP traffic that is applied to VoIP traffic.

As shown in the fourth row of table 400 (identified by reference numeral 4 in FIG. 4), any inbound traffic from gateway 130 which lands on (is received at) UDP port 5060, is to be redirected to interior IP 192.168.1.1/32 UDP port 5060 and, gateway 130 is to apply the VoIP policy and bill that traffic to billing ID 9.

As shown in FIG. 4, the fifth row of table 400 (identified by the numeral 5), any other traffic (i.e., traffic whose source and/or destination is not known) is to be considered "Default" and gateway 130 is to subject those traffic data flows to the default policy, and apply billing ID 0. The default policy is a policy that is applied to any traffic that does not fit within defined parameters for other policies handles by client router 120 (e.g., web policy or VoIP policy).

Client router 120 may perform network address translation based on configuration table 400. Gateway 130 may apply a corresponding predetermined policy or billing operation to the data flows identified by the configuration table 400 (e.g., a data flow that fits the requirements of the first six columns of row 3 is to be subjected to attributes 435 including billing at gateway 130). Client router 120 may transmit the configuration table 400 to gateway 130.

Figure 5:
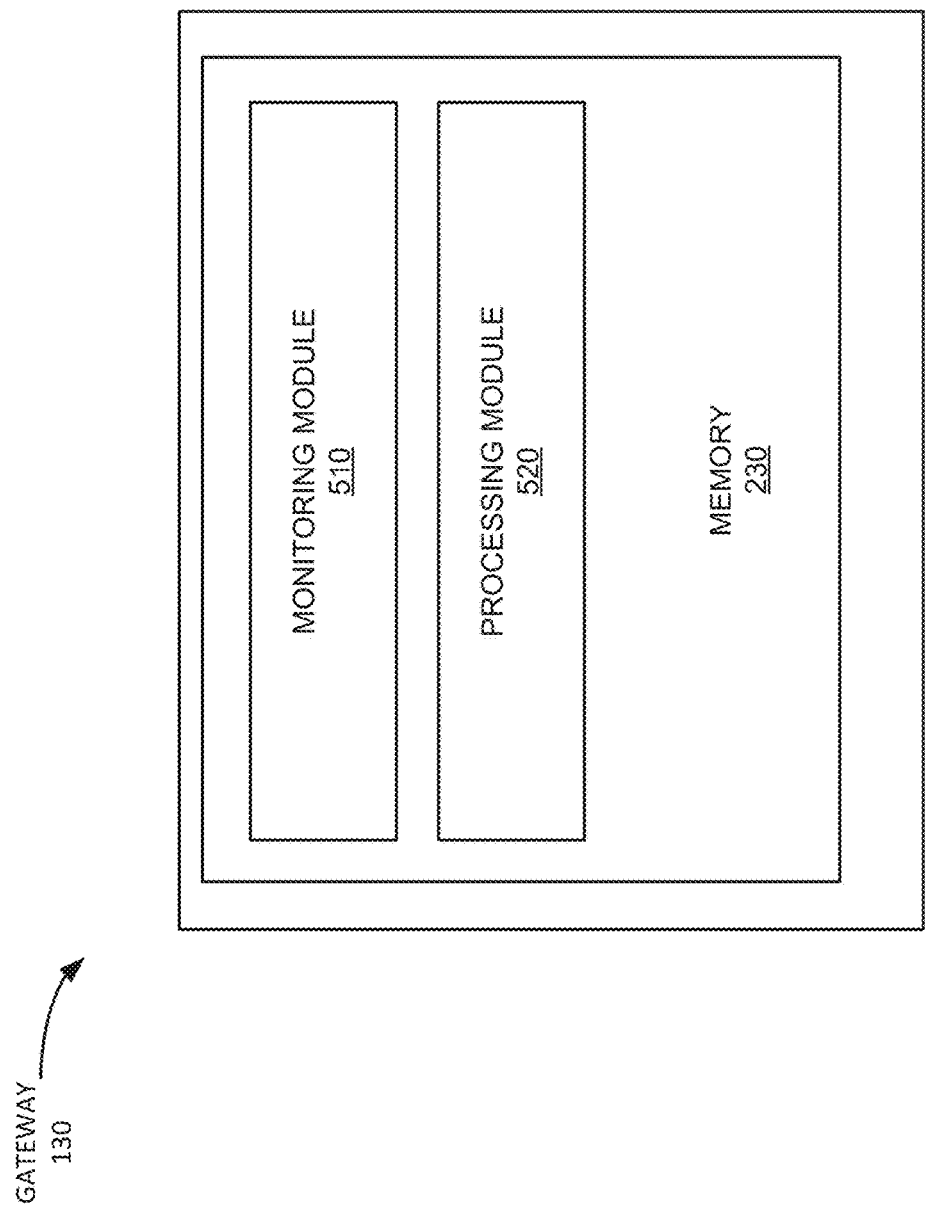
FIG. 5 is a functional block diagram of the gateway of FIG. 1.

FIG. 5 is a diagram of exemplary functional components of gateway 130. As shown in FIG. 5, gateway 130 may include a monitoring module 510 and a processing module 520. The particular arrangement and number of components of gateway 130 as shown in FIG. 5 are illustrated for simplicity. The logical blocks illustrated in FIG. 5 may be implemented in machine-readable instructions, hardware, or a combination of hardware and machine-readable instructions. For example, in one implementation, all or some of the logical blocks illustrated in FIG. 5 may be implemented by processing logic 220 (FIG. 2) executing machine-readable instructions stored in, for example, memory 230.

Monitoring module 510 may monitor a communication channel to determine instances of connections from client router 120 (and consequently client devices 110 behind client router 120). The communication channel may be a separate channel that may be used to provide the configuration table 400 from the client router 120 to gateway 130. For example, monitoring module 510 may include a service process that listens to communications on a predetermined uniform resource locator (URL). For example, the URL for the communication channel provided by the service provider may be http://CC.serviceprovider.NET. The service process may monitor the predetermined URL for connections from client router 120. In instances in which client router 120 connects to gateway 130, client router 120 may convey configuration table 400 in a defined protocol (e.g., Extensible Markup Language (XML), JavaScript Object Notification (JSON), etc.).

Monitoring module 510 may implement the service process that monitors the communication channel using configuration table 400 based on predetermined assumptions regarding processing at client router 120. Monitoring module 510 (and consequently the service process) may assume network address translation has been implemented by client router 120 for the received data flows and make appropriate source address modifications. Monitoring module 510 (and consequently the service process) may also reduce the load on the gateway 130 by storing one and only one configuration table 400 for each session. Client router 120 may update configuration table 400 as often as instructed and any updates received at gateway 130 will remove the previous table from memory storage associated with gateway 130.

Processing module 520 may apply attributes 435 (corresponding to the data flow from configuration table 400) to define data flows in instances in which configuration table 400 is known both to client router 120 and gateway 130. Client router 120 may continue network address translating (NATing) tasks based on configuration table 400. Processing module 520 may perform NATing based on a 5-tuple for the data flow (e.g., source IP, source port, destination IP, destination port, and protocol). Client router 120 may send updates to configuration table 400 to processing module 520. Processing module 520 may confirm with client router 120 that it has loaded the configuration table 400 and that it is ready for data flows after processing the update to configuration table 400. For example, client router 120 may assign a billing ID of "6" to Wi-Fi data flows that are output over a range of ports. Processing module 520 may receive a data flow and assign billing ID 6 based on the common configuration table 400. Processing module 520 may label the data flow with a particular billing tag and send the data flow to billing system 140 with billing tag and MDN. Billing tags may indicate a class or group that a data flow is to be billed to (e.g., that may be tabulated for billing by billing system 140). Processing module 520 may label and process any flows sent to billing system 140 before the configuration table 400 is "ready" (or currently updated) as default.

Figure 6:
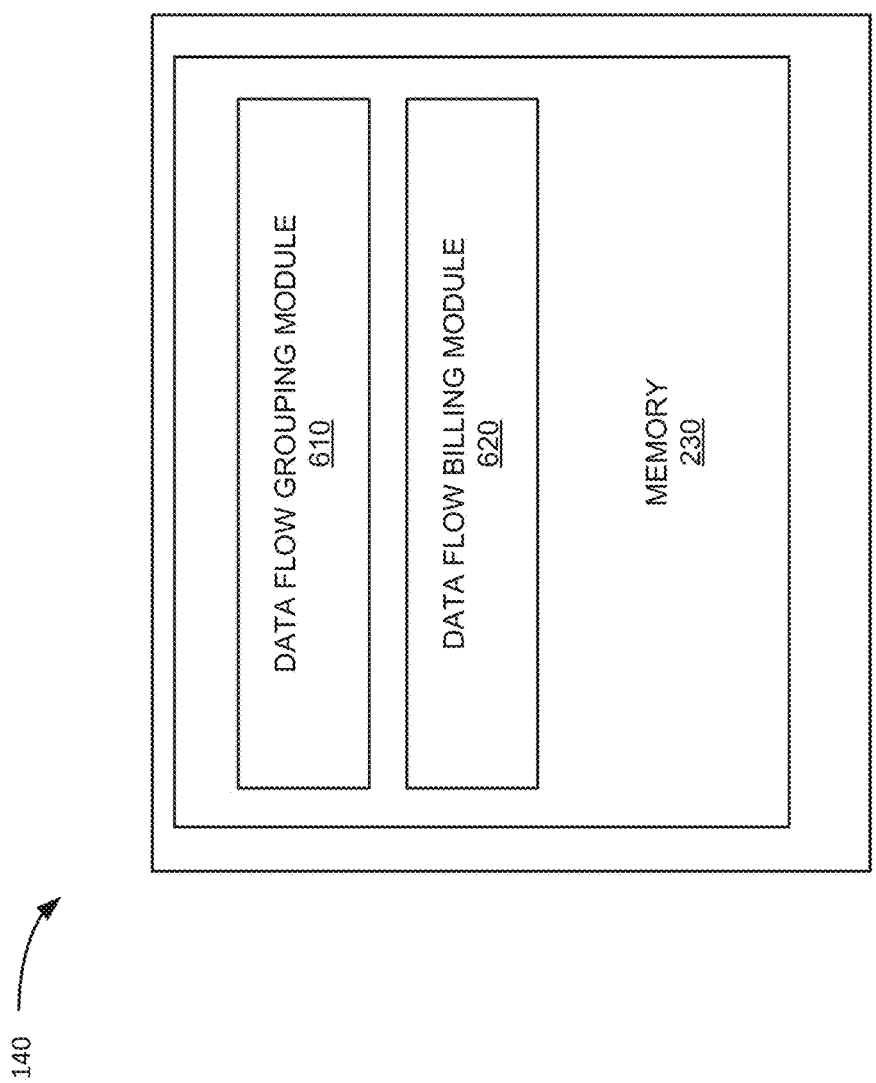
FIG. 6 depicts a functional block diagram of the billing system of FIG. 1.

FIG. 6 is an exemplary functional block diagram of billing system 140. As shown in FIG. 6, billing system 140 may include data flow grouping module 610 and data flow billing module 620. The particular arrangement and number of components of billing system 140 as shown in FIG. 6 are illustrated for simplicity. The logical blocks illustrated in FIG. 6 may be implemented in machine-readable instructions, hardware, or a combination of hardware and machine-readable instructions. For example, in one implementation, all or some of the logical blocks illustrated in FIG. 6 may be implemented by processing logic 220 (FIG. 2) executing machine-readable instructions stored in, for example, memory 230.

Data flow grouping module 610 may receive data flows and sort the data flows according to previously specified or predetermined billing groups. Data flow grouping module 610 may receive data flows based on a 5-tuple approach in which labels or unique billing tokens (e.g., 20 unique billing tokens) were applied to unique ingress port ranges of client router 120. Client router 120 (e.g., a vehicle telematics control unit) may place traffic on port sets when the data flows are output (via egress on client router 120) to the network. Gateway 130 may receive the data flows from client router 120 and examine the incoming ports. Gateway 130 may use the same rules to apply the correct billing rating group ID to data flows to be billed to particular billing groups (e.g., billing group 6). Data flow grouping module 610 may receive and compile billing information for data flows as records flow to billing system 140.

Data flow billing module 620 may measure the data flows associated with a billing rating group ID and apply billing arrangements to the data flows based on predetermined contractual agreements. For example, data flow billing module 620 may identify a vehicle modem number and billing ID number to bill the data flow (e.g., infotainment may be billed to a content or service provider, vehicle telematics unit number may be billed to a car maker, Wi-Fi services may be billed to a personal account with service provider, etc.). Client devices 110 may be subject to specialized billing arrangements based on what client device 110 behind client router 120 is using the traffic data flows (and in some instances, what user accounts).

Data flow billing module 620 may bill to accounts based on a label assigned to the data flows. In instances in which the data flows are not properly credited to a specified account, the data flows may be billed to a default entity and in a specified billing format (e.g., the providers of the client router 120). The billing format may include for example, a flat fee, a subsidized fee, a tiered fee, etc. The billing may be applied to accounts associated with different interested parties including the end user customer or subscriber (i.e., telematics services subscriber), the service provider, content providers, equipment manufacturers, etc.

Figure 7:
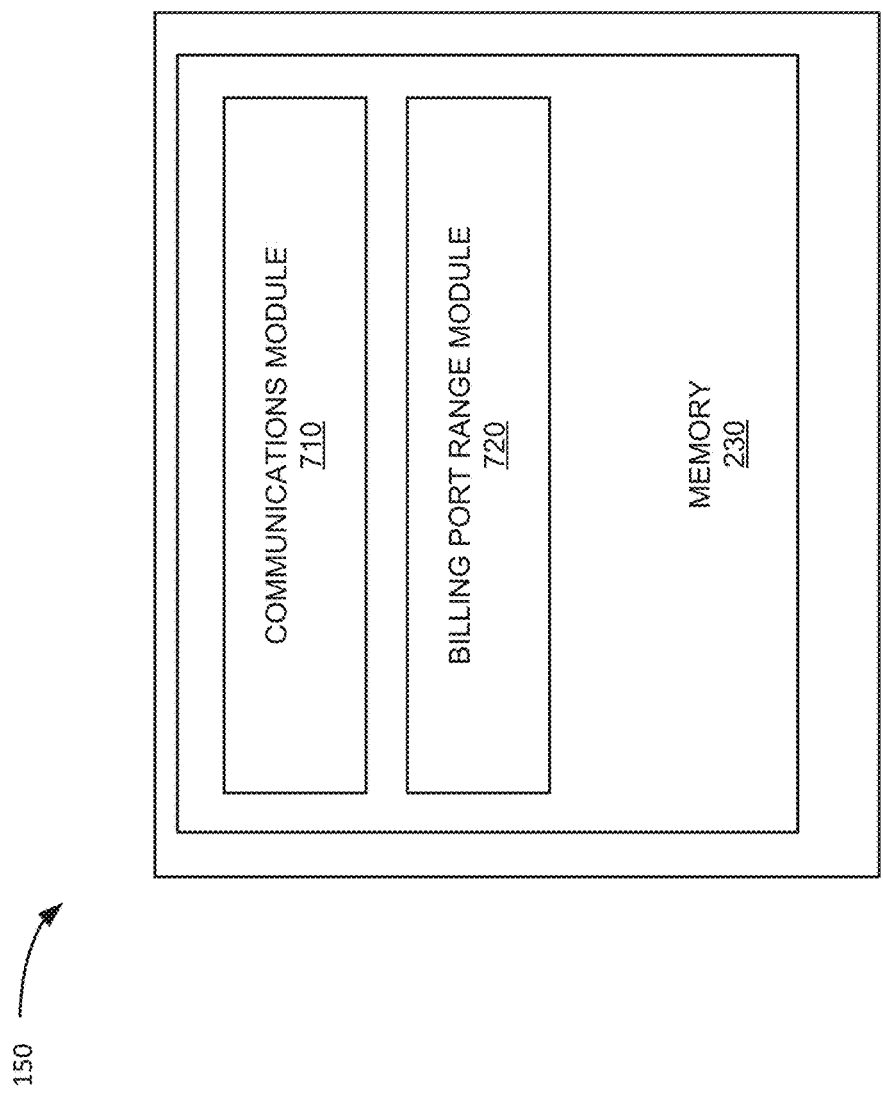
FIG. 7 depicts a functional block diagram of the provisioning system of FIG. 1.

FIG. 7 is an exemplary functional block diagram of provisioning system 150. As shown in FIG. 7, provisioning system 150 may include communications module 710 and billing port range module 720. The particular arrangement and number of components of provisioning system 150 as shown in FIG. 7 are illustrated for simplicity. The logical blocks illustrated in FIG. 7 may be implemented in machine-readable instructions, hardware, or a combination of hardware and machine-readable instructions. For example, in one implementation, all or some of the logical blocks illustrated in FIG. 7 may be implemented by processing logic 220 (FIG. 2) executing machine-readable instructions stored in, for example, memory 230.

Communications module 710 may provide an interface for communication with systems that require provisioning, such as client router 120 and an associated vendor (e.g., systems associated with a vehicle telematics control unit (TCU) vendor). Communications module 710 may receive notification from client router 120 that there is a new service that is requesting to generate data flows across client router 120. Client router 120 may send identification of a source port and the billing tags that client router intends to use in labeling the data flows. Communications module 710 may provide a secured encrypted link between provisioning and back end systems, such as gateway 130 and billing system 140, associated with the service provider (i.e., the data services provider).

Billing port range module 720 may receive a request from client router 120 to provision data flows. For example, a customer may purchase a service through a particular channel. Client router 120 may communicate with billing port range module 720 and indicate that a new service has been purchased. Billing port range module 720 may provide a billing tag associated with the new service. Billing port range module 720 may request that client router 120 inform billing port range module 720 when the new information has been implemented. Client router 120 may open up the appropriate traffic flows for the new service. In some instances client router 120 may identify itself and inform billing port range module 720 that it intends to add a new service and that client router expects to use particular billing tags and source ports and that it expects to bill to a particular entity. Billing port range module 720 may direct client router to use a different port range instead. Billing port range module 720 may enforce rules about how to allocate ports.

According to an example, client router 120 may be a TCU computer. In instances in which the TCU computer powers up, the TCU computer may connect to its associated back-end system, such as a telematics operations center server ("TOC") that may include billing port range module 720, and send an identifier for the TCU and modem number. The TCU computer may request appropriate 5tuple information for an account associated with the TCU. Billing port range module 720 may transfer the requested information over the network to TCU computer. The information may include 5tuple port information and instructions to the TCU computer on how to apply available ports. For example, the TCU computer may be required to apply a billing ID to a particular port range (e.g., billing ID 9 port range x to z, etc.).

Figure 8:
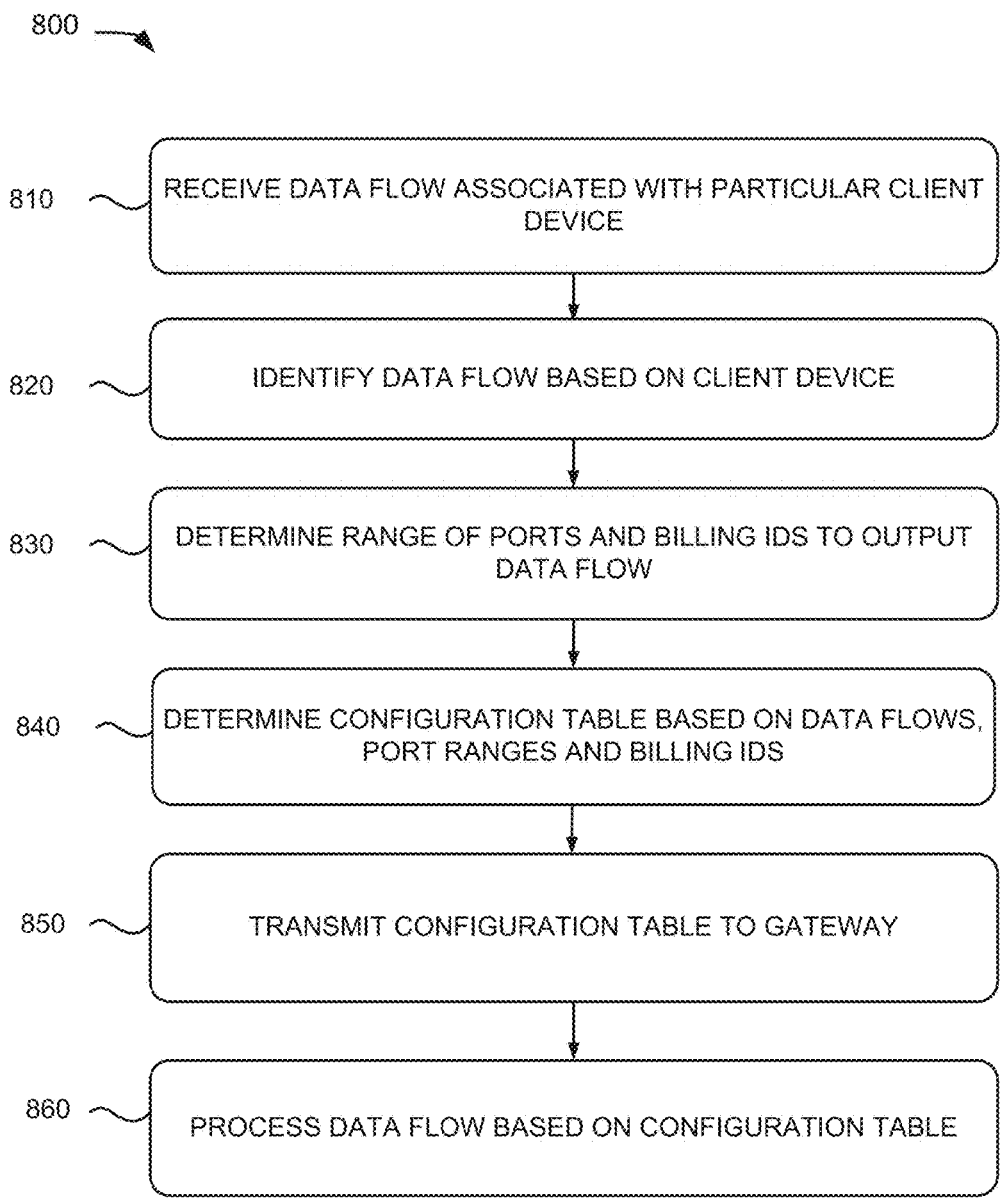
FIG. 8 is a flowchart of an exemplary process for billing multiple packet flows associated with a client router according to an implementation described herein.

FIG. 8 is a flowchart of an exemplary process for providing adaptive security management of a client device according to an implementation described herein. In one implementation, the process of FIG. 8 may be performed by client router 120. In other implementations, some or all of the process of FIG. 8 may be performed by another device or a group of devices separate from client router 120 and/or including client router 120.

Client router 120 may receive a data flow associated with a particular client device 110 (or data flow generating entity) (block 810). The data flow generating (or consuming) entity is a source or receiver of data via client router 120 and may include a client device 110. Alternatively, the data flow generating entity may include a particular application from a client device 110. Multiple data flow generating entities may be associated with a single client device 110. The data flow may be associated with a particular application. The packet data flow may be transmitted over a communication link between client router 120 and the client device 110.

Client router 120 may perform NAT operations for multiple interior client devices 110 and/or applications via a mechanism for NAT translation. Client router 120 may provide NAT translation services including address and port translation.

Client router 120 may identify each data flow based on the client device 110 (or data flow generating entity) that sends or receives each of the packet data flows (block 820). For example, client router 120 may identify the packet data flow based on a client device 110, an application, etc.

At block 830, client router 120 may determine a range of ports that the data flows are to be output on (i.e., the egress side of client router 120) and billing IDs for the port ranges. For example, client router 120 may connect to an associated management system (e.g., maintained by a manufacturer or other servicer of the client router 120) and ask for appropriate provisioning for data flows (e.g., via provisioning system 50). Client router 120 may receive port ranges and billing IDs for the data flows associated with the data flow generating entities. Alternatively, client router 120 may allocate port ranges for various data flow generating entities and inform the provisioning system 150 of the port range. Provisioning system 150 may confirm that the allocated port ranges are allowed or deny the request based on network rules.

At block 840, client router 120 may determine a configuration table (e.g., similar to configuration table 400) based on the range of ports, the billing identifier and the data flow. Client router 120 may compile the data flow, assigned addresses and ports along with the billing IDs, protocol, attributes of the packet data flows, and, in some instances, identifiers of the data generating entities into a table that is to be transmitted to the back end systems (e.g., configuration table 400). The back end systems may include gateway 130, and billing system 140.

Client router 120 may transmit the configuration table 400 to the gateway 130 and other back end systems (block 850). Gateway 130 and the back end systems may acknowledge receipt of the configuration table 400. For example, gateway 130 may send a message acknowledging receipt of the table 400 (or updates to table 400) to client router.

At block 860, client router 120 may process data flows based on the configuration table 400. For example, client router 120 may perform NAT translation operations for client devices 110 with client router 120 based on configuration table 400. Data flows associated with particular client devices 110 may be output on particular port ranges corresponding to particular billing IDs. In addition, for port ranges outside of the designated port ranges (i.e., the port ranges determined at step 830), client router 120 (and billing system 140) may apply a default billing ID (that may belong to the TCU vendor).

Billing system 140 may apply the billing IDs to the data flows and bill the appropriate entities based on predetermined contracts.

In another implementation, an exemplary extended header 900 may be associated with a packet flow in a network, such as environment 100, depicted in FIG. 1 hereinabove. An originating network node, such as client router 120, within a network path may transmit packet flows along a network path via several subsequent nodes (e.g., via gateway 130 and other nodes, not shown in FIG. 1). Flows from the originating node (client router 120) may pass through these subsequent nodes before exiting the network. The network may run Internet Protocol version 6 (IPv6) as its common protocol.

FIGS. 9A, 9B and 9C illustrate, respectively, an exemplary extended header 900, a flag bit key table 950 for the extended header, and a definitions table 970 for the extended header.

Extended header 900 may include a flags field 910, which may be a 16-bit field, a ticket field 912, which may be a 32-bit field, a company ID field 914, which may be a 32-bit field, a sub command ID field 916, which may be a 32-bit field, a command string field 918 which may include a string, a type code field 920, which may be an 8-bit field, a length field 922, which may be a 16-bit field, and an opaque data field 924. The meanings associated with the fields may be provided in a definitions table, such as table 970 shown in FIG. 9C.

As shown in FIG. 9A, extended header 900 may be used as a means to convey instructions for processing the flow within the (same) packet flow (i.e., extended header 900 allows the network operator to "tag" the flows). Extended header 900 may allow the system to "tag" IPv6 packets with meta-data. This meta-data may be used as a "container" for a message and/or instructions received from the network operator or other source of input for the system. Extended header 900 may provide "markers" on each packet which may be carried along, node to node.

Extended header 900 (and the processing of extended header 900) may conform to requirements of IPv6 extension headers per request for comment (RFC) 7045 and follow the rules applicable to IPv6 extension headers. Packets that include extended header 900, similar to any IPv6 packet with an extension header, must have a globally unique extension header ID. Any router/node processing IPv6 packets must either process extended headers 900 or pass them on to the next node. An unknown header must be passed on or processed by each node.

Extended header 900 may be determined based on a unique header that may itself be extended. For example, extended header 900 may be determined based on a RADIUS Vendor specific attributes (VSA) structure as defined in RFC 2865. Extended header 900 may be determined based on this unique message structure that allows an entity to define unique messages for any two network nodes. Additionally, extended header 900 may be extended and combined with IPv6 extension headers and therefore provide a mechanism for passing messages back and forth between network nodes, each message being "attached" to the flow to which it belongs.

According to an embodiment, all vendor specific headers transmitted within environment 100 may be encapsulated within an IPv6 extended header type. The extended header 900 may be determined based on an expanded version of the RFC 2865 RADIUS VSA definition. The extended header 900 may be a VSA extended header that is defined as a field set encapsulated in the extended header type (e.g., the extended header 900 may be assigned, for example, extended header type 26 based on the corresponding RADIUS Vendor Specific Attribute type 26).

An exemplary implementation of flag field bits 950 included in flag field 910 is shown in FIG. 9B. According to an example, flag field 910 includes 16-bits. The first 12 bits (15 to 4) may be unused. The remaining 4 bits (bits 0 to 3) may be assigned values of forward (F1, F2), notify (N) and correct (C), as further described with respect to FIG. 9C.

FIG. 9C depicts a field definition table 970 for the extender header of FIG. 9A. As shown in FIG. 9C, field definition table 970 includes definitions for each of the fields in the extended header 900.

Flags field 910 is a unique bit field which instructs each network node how to process the extended packet. As discussed above, four bits may be used. Ticket field 912 stores a unique 32-bit value that can be used to correlate commands and responses between nodes. Company ID field 914 stores a unique 32-bit ID that the Internet engineering task force (IETF) may assign to a given company. The company field may be analogous to the VSA Company ID. Sub command ID field 916 stores a second unique 32-bit ID which a given company can use to sub-divide its command space. Command string field 918 stores a string value that defines the command. Type field 920 stores an 8-bit type code analogous to the VSA type code. This code may include information regarding the type of data that is transmitted to the node. In some instances, the information may include VSA type codes. Length field 922 stores a 16-bit length value that indicates the size of the opaque data. Opaque data field 924 includes the value of the data itself.

Additionally, while the extended VSA header may be used to convey information, a command/response may also be included to allow nodes to communicate with one another. The command/response communication may be executed in a similar manner to the RADIUS Change-of-Authorization (CoA) model. The command/response communication may be performed using the Company ID 914 field and Sub command ID 916 field.

According to an example, the command/response communication may include a value 0x00000000 that is reserved for the protocol itself and, by convention, Sub Command 0x00000000 for CoA style exchanges. The command/response communication may attach these messages to an IPv6 Internet Control message protocol (ICMP) ECHO packet. In instances in which a node is to respond to a given command, the node may first create an IPv6 ICMP ECHO packet with the destination address set to the node address that it intends to contact. The node may then attach an IPv6 Extension Header Type 26 (VSA), with Company ID 0, Sub Command 0. The node may use the Ticket ID of the extended header that the node received. For example, if the command sent to the node includes Ticket 5555, the node may send a response with Ticket 5555. The node may then send any desired data in the command string, type and value fields, 918, 920, and 924, respectively. The flag bits may inform a receiving node how the receiving node should handle an extended header.

Figure 10:
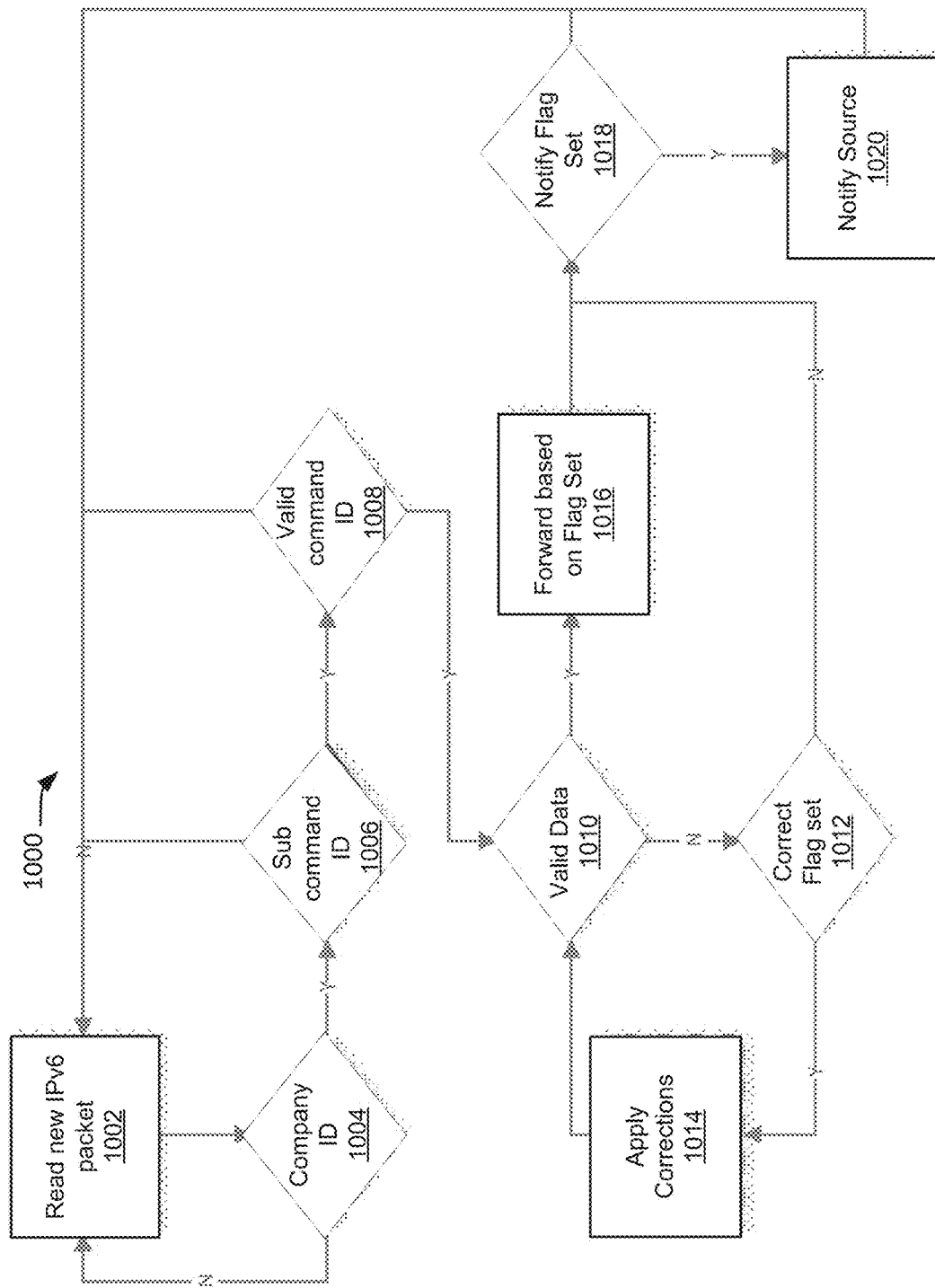
FIG. 10 depicts a flow chart of a process of forwarding a packet with an extended header.

FIG. 10 depicts a flow chart 1000 of a process of forwarding a packet with an extended header. The process may be implemented using a receive, process, correct, forward and notify loop.

As shown in FIG. 10, a network node (e.g., client router 120) may receive and read an IPv6 packet (block 1002). If that packet contains extended headers, such as extended header 900, the node may first check to determine if the header contains the Company ID (1004) and Sub Command ID (1006) for this node. If not, the network node may determine that this packet was not transmitted with a destination for the network node and processing may continue. In instances in which a valid Company ID and Sub Command ID are identified, the node may inspect the command string for commands recognized by the node.

In instances in which a valid command string or ID recognized by the node is found (1008), the process may proceed to the next step. Otherwise, the node may proceed to the next packet. In instances in which a valid Company ID, Sub Command ID, and Command String, the node inspects the command type and value to determine whether the data is valid (1010). If valid data is identified, the command corresponding to the command ID is run, and the node proceeds to the forwarding stage (1016). However, if the command type or value are incorrect (i.e., not valid), and, if the Correct flag is set in flags field 910 (1012), the node may apply appropriate corrections (1014) before moving repeating the check. If the forwarding stage requests notification of the source via the notify flag (1018), the node may send the notification in an IPv67 ICMP ECHO packet with Company ID (0), Sub Command (0) (1020).

FIG. 11 depicts a routing table 1100 for packets with extended headers. Routing table 1100 may include a direction 1110, a source IP address 1120, source ports 1130, destination IP 1140, destination ports 1150, protocol 1160 and extended header VSAs 1170.

Routing table 1100 may be implemented for client routing in instances in which a client/customer/vehicle router (such as client router 120) is IPv6 capable on its egress interface. Client router 120 may be capable of processing IPv6 extension headers including the proposed VSA Extended Header (extended header 900), and, client router 120 may be capable of tracking flows from its ingress interfaces.

Client router 120 may be configured with a table 1100 which maps 5-tuples (source IP, source port, destination IP, destination port, protocol) to IPv6 extended header values. The ingress interfaces may be IPv4 or IPv6 compatible and client router 120 may map ingress flows onto the gateway supplied IPv6 address. According to an example, client router 120 may include two ingress devices using IPv4 with client router 120 assigned dynamic addresses. Client router 120 may route packets received from these devices to a gateway supplied IPv6 address, and, client router 120 may track and alter mappings via a table such as table 1100.

As show in table 1100, any client whose private IP address lies within the range of 192.168.0.1 through 192.168.0.15 and whose traffic is destined for the standard web ports TCP 80 and 443, is required to have an IPv6 extension header type 26 (VSA) appended to its flows during output. This VSA is used to request that nodes apply the SetBilling command to the flow with a value of 5, and, in instances in which the node cannot apply value 5, it may correct the value. No notification back to client router 120 may be needed and the first node which can process the request may delete the header (because no forwarding is requested).

Any client whose private IP lies within the range of 192.168.0.17 through 192.168.0.31 may be handled in a similar manner except that Billing ID 9 may be requested and, if a correction is required, the node must notify the source (because the NOTIFY flag is set). Finally, any other flows shall be subjected to Billing ID 0.

Client router 120 may apply IPv6 headers by appending headers after the first initial IPv6 header and, before the protocol header which must be the last header in the header set. Client router 120 may apply IPv6 headers Per RFC 7045. Client router 120 may apply the headers using a mechanism that is operating system specific and there may be no user-level application programming interfaces (APIs) for IPv6 header manipulation. Client router 120 may append IPv6 headers and each header may travel within its respective IP flow. The flow may carry its own directives in the flow headers (and therefore there is no need to correlate flows to directives).

Extended headers 900 may be required by nodes only during the initial stages of processing data flows. Since nodes carry their own headers, if the node can track flows on its own, as is often the case with NAT routers or access gateways, headers are only required as the start of the flow. Therefore, TCP flows, which by their design have a TCP SYNC phase, only need extended headers 900 during the initial TCP setup. From then on, since the TCP flow is stateful, the gateway (e.g., gateway 130) may apply appropriate treatments without the need for new extension headers. Connectionless flows, however, such as UDP or ICMP, are stateless by design. Therefore, there is no way to "pin" extended headers 900 to such flows. Each connectionless flow for TCP/IP must carry its own extended headers 900.

FIG. 12 is a flowchart of an exemplary process for processing a packet flow with an extended header according to an implementation described herein. In one implementation, the process of FIG. 12 may be performed by client router 120 and/or gateway 130. In other implementations, some or all of the process of FIG. 12 may be performed by another device or a group of devices separate from client router 120 and gateway 130 and/or including client router 120 and gateway 130. Processing in FIG. 12 is described with respect to the extended header VSA table in FIG. 13 and the extended header for a packet flow and a corrected extended header in FIGS. 14A and 14B.

Processing begins at client router 120, which is a node in a network with multiple nodes (e.g., environment 100), all of which communicate with a common minimum transmission protocol, such as TCP/IP version 6. Client router 120 may be a vehicle device such as a telematics control unit in an automobile network that receives packet flows from devices within the vehicle network, such as navigation devices, entertainment devices, user devices associated with passengers, etc. The first node (client router 120) in the path may be referred to as the SOURCE node. The next node in the path may be a packet gateway (e.g., gateway 130) which recognizes Extended Header VSA structure and uses a VSA table, such as table 1300 shown in FIG. 13 for various operations.

Client router 120 may include a routing table 1100 for IPv6 flows. Gateway 130 may follow the RECEIVE, PROCESS, CORRECT, FORWARD, and NOTIFY loop as described with respect to FIG. 10.

At block 1210, when a flow starts from a CLIENT (e.g., client device 110) from an ingress device with assigned IP 192.168.0.6, client router 120 may perform an IPv4->IPv6 network address translation, and, based on routing table 1100, client router 120 may add an IPv6 extension header (e.g., type 26) to the TCP flow. Client router 120 may identify one or more packet data flows based on a user application running on a user (or client) device, wherein the one or more packet flows are flowing over a communication link between the router 120 and the one or more user devices.

Router 120 may determine, at block 1220, an extended header 1400 to be included with the flow and instructions that include a Ticket ID (Randomly generated by client router 120)=9921, a Service provider's VSA ID=23001, and a Service provider's Wireless Sub Command ID=1. The header 1400 may contain information as illustrated in FIG. 14A, including an extended header type (26), an extended header length (5), flags (0x000C), ticket (9921), company ID (23001), sub command ID, command string, type, length and value.

At block 1230, client router 120 may send the flow including a TCP connection header with an extended header 1400 (which may conform to requirements of extended header 900) added to it.

Gateway 130, at block 1240, may initiate the RECEIVE, PROCESS, CORRECT, FORWARD, NOTIFY loop 1000 as described herein above with respect to FIG. 10. As part of the processing described with respect to FIG. 10, gateway 130 may determine whether extended headers exist for a particular packet flow. If no headers exist, gateway 130 may proceed with normal processing (block 1250).

However, in some instances, gateway 130 may determine that an extended header type 26 (VSA) exists (block 1260). Gateway 130 may read and strip the IPv6 Extended Header, leaving only the VSA fields. Since the Company ID, Sub Command ID and Command String are known to gateway 130, gateway 130 may continue extended header processing. In instances in which any of the steps of the receive, process, correct, forward and notify loop has failed, gateway 130 may drop the header 1400 and processing of packets would continue. Processing may include accounting for usage, or billing for the packets associated the packet data flow. Gateway 130 may read the Flags field 910 and determine that subsequent processing will require notification and correction, but forwarding of headers is not required (the forward bits are not set.). Thus, after packet processing, this extended header 1400 may be removed.

Gateway 130 may save the random ticket value sent by client router 120. Gateway 130 may use the random ticket value with notifications. Gateway 130 may gather the value, which is expected to be of type 16-bit integer, and identify a value of 5. Finally, gateway 130 may invoke its SetBillingID function as specified by the Command String and set the value of that function to 5. Any traffic for this flow will now be billed to Billing ID 5. The header 1400 may be discarded and packet processing may continue. In instances in which the commands are correct (a correct Company ID, Sub Command ID, and Command String), but nonetheless, an incorrect BillingID value was included in the packet, because the Correct flag was set, gateway 130 may alter the value of that command to a defined correct value.

Furthermore, in instances in which corrections are required, gateway 130 may construct a new Extended Header Type VSA (26) 1450 with the following structure as shown in FIG. 14B. The extended header 1450 may then attach to an IPv6 ICMP ECHO message with the source being that of the sending node, and the destination to the CLIENT (client router 120). Additionally, gateway 130 may return the same ticket ID it was issued when client router 120 sent its extended header 1400. Client router 120 may use this ticket to correlate commands and responses.

According to an embodiment, the client router 120 may include a vehicle telematics unit. Client router 120 may communicate with another vehicle telematics unit via packet flows that include extended headers 900, such as described herein above, to establish communications via provider back end systems including provisioning system 150. For example, client router 120 may receive an identification associated with another vehicle (e.g., a vehicle identification number (VIN)) broadcast by the other vehicle. Client router 120 may send this identification to the provider back end systems to allow establishment of communications via client router 120 without providing personal information to the driver associated with the other vehicle. The communications may be maintained via the packet flows that include the extended headers 900.

According to another example, client router 120 may implement live provisioning of billing and port range information. In this example, client router 120 may receive a request from an engine measurement computer to provide customizable ignition air/fuel ratios for different engine speed ranges. Client router 120 may provide air/fuel ratios optimized for different fuels, different countries and regulations. Client router 120 may provide instructions to change the air/fuel ratio via a radio frequency (RF) signal ("over the air") with a packet flow that includes extended headers 900. Client router 120 may send the instructions to an associated engine computing device (e.g., an engine measurement computer, etc.). Client router 120 may upload the changed values over the air so that the vehicle runs differently in instances in which the technology has changed or new regulations are passed.

Figure 15:
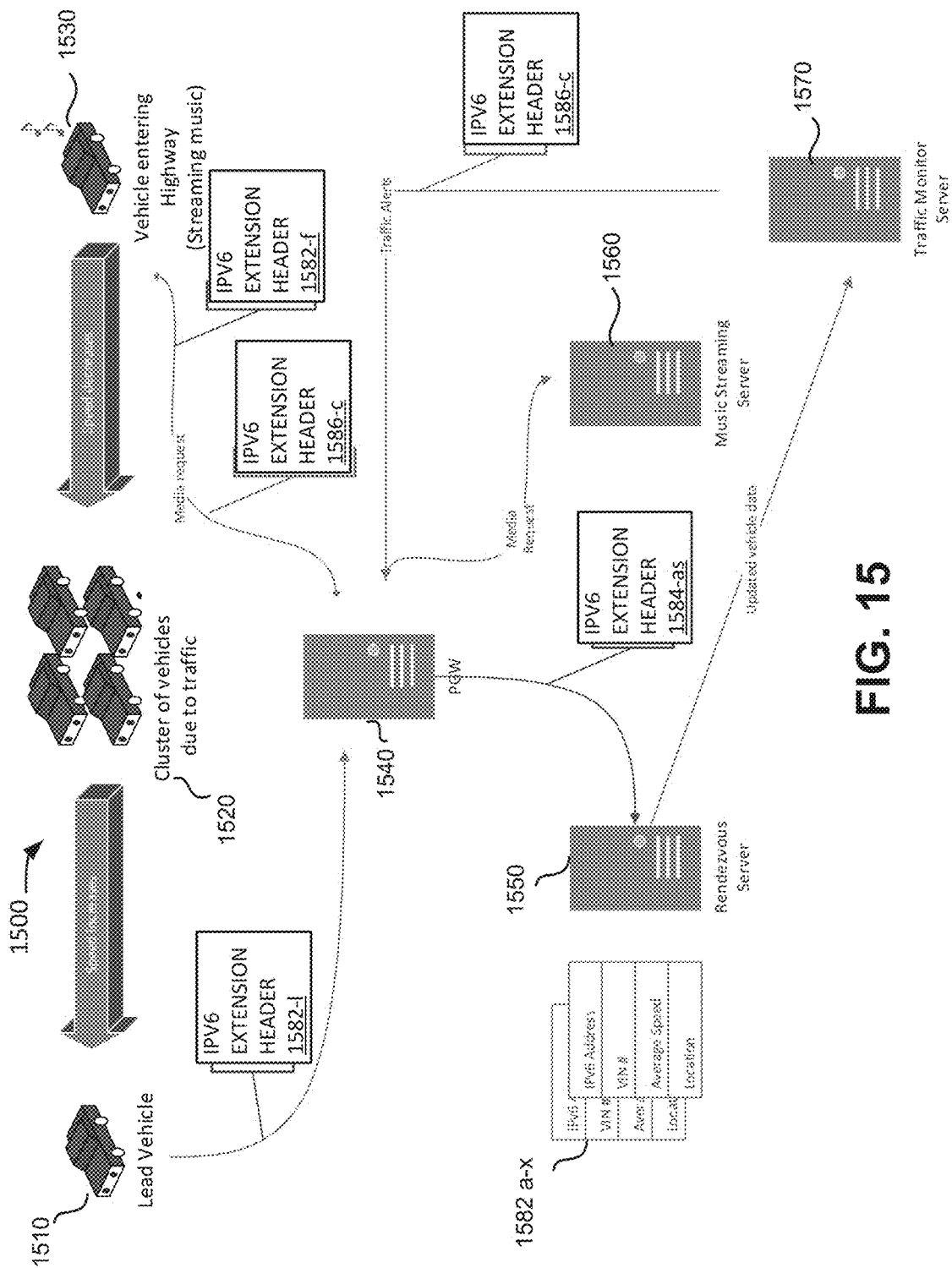
FIG. 15 depicts an implementation of a traffic alert system based on the extended header.

FIG. 15 depicts an implementation of a traffic alert system 1500 based on the extended header. As shown in FIG. 15, traffic alert system 1500 may include a lead vehicle 1510, a cluster of vehicles 1520, a following vehicle 1530, a packet gateway (PGW) 1540, a rendezvous server 1550, a music streaming server 1560 and a traffic monitor server 1570.

As shown in FIG. 15, several vehicles, including lead vehicle 1510, vehicles among cluster 1520 and following vehicle 1530 may be equipped with IPv6-capable communication devices (not separately shown in FIG. 15). The IPv6-capable communication devices may use an IPv6 extension header model on a service provider network. Lead vehicle 150 may be a vehicle located ahead of any traffic issues. Cluster of vehicles 1520 may be within a local traffic block. Following vehicle 1530 may be a vehicle entering the highway. Following vehicle 1530 may use an IPv6, extended-header enabled, network device to access an application that requires transfer of data over the service provider network, such as a streaming music service.

According to an embodiment, as lead vehicle 1510 drives down the highway, an IPv6-capable communication device deployed in lead vehicle 1510 (e.g., the machine-readable instructions or software) may append a new extension header 1582-1 to the data flows as part of its normal network activity (i.e., based on data transferring applications that are being used). For example, a new extension header may be defined as shown in FIG. 16A. The values displayed in FIG. 16A are examples only and listed as descriptions rather than actual binary values:

Lead vehicle 1510 may send data with extension headers 1582-1 which indicate that the lead vehicle has a defined VIN, defined GPS coordinates, and a current speed. The data may be encapsulated in an extension header with appropriate company IDs, sub company IDs, a command code, etc., such as described hereinabove.

Packets may flow from the IPv6-capable communication device in lead vehicle 1510 to PGW 1540. PGW 1540, in a similar manner as gateway 130 defined hereinabove, may read the extended header flags and, based on the flags and command, forward this packet to its destination. However, PGW 1540 may extract the extension header and send that extracted data (including traffic information) to rendezvous server 1550, which may be a collection server for traffic information. Rendezvous server 1550 may collect updates to traffic information from IPv6-capable communication devices deployed (or associated with) each of the vehicles. Rendezvous server 1550 may collect a real time compilation of traffic information in active tables for each vehicle. Each active table may include an IPv6 address (from the IPv6 packet), a vehicle identification number (VIN) number, global positioning system (GPS) coordinates and a current speed associated with the particular vehicle.

In this example, other vehicles may follow lead vehicle 1510 and, for various reasons, end up in cluster 1520. Accordingly, any traffic behind lead vehicle 1510 (e.g., vehicles in cluster 1520) may be slowed. Additionally, following vehicle 1530 may enter the traffic flow. An IPv6-capable communication device deployed in following vehicle 1530 may use a streaming media service that transmits and receives data to and from music streaming server 1560 over the service provider network. As part of normal operations, the IPv6-capable communication device deployed in following vehicle 1530 may send vehicle updates via IPv6 extended headers "attached" to its media packets. These packets may also be captured and copied to rendezvous server 1550. These updates may be compiled for all vehicles (shown as 1582*a-x* in FIG. 15).

Rendezvous server 1550 may send data to traffic monitor server 1570 which may be coupled to rendezvous server 1550 via a wired and/or wireless network. Traffic monitor server 1570 may perform analytics based on the traffic information (e.g., speed of vehicles, location, etc.) to determine where traffic clusters are in the path of following vehicle 1530.

In some instances, traffic monitor server 1570 may determine that a vehicle is entering a zone of traffic congestion and may send an IPv6 message to the vehicle that is entering or headed for the zone of traffic congestion. For example, the IPv6-capable communication device deployed in following vehicle 1530 may be accessing streaming media from music streaming server 1560. Return packets may carry a return packet extension header 1586-*c* (for congestion), which may include a format 1650 such as shown in FIG. 16B. The format of return packet extension header 1586-*c* may be a format 1650 that the following vehicle IPv6-capable communication device is capable of processing. The return packet extension header 1586-*c* may be received by following vehicle IPv6-capable communication device as part of a media stream. Following vehicle IPv6-capable communication device may capture and process the return packet extension headers 1586-*c* as a part of an IPv6 flow while media (such as streaming music) continues in the IPv6 flow. Following vehicle IPv6-capable communication device may receive the message and determine that the traffic service has determined that following vehicle 1530 (based, for example on VIN #=, GPS=#) will experience congestion for a particular distance (e.g., 3 miles).

Traffic alert system 1500 may transparently tag any application with extension headers. In this instance, a media stream may carry the header information for other applications without needing modifications of its own. Additionally, headers typically are not counted in payload billing. In a similar manner, as an integrated services digital network (ISDN) signaling channel, traffic alert system 1500 may send (or support the sending of) short messages between IPv6 nodes without significant application overhead, or new billing.

Systems and/or methods described herein may allow billing of data flows from multiple client devices associated with a client router. The systems may allow the client router to acknowledge and propagate self-identified billing identifications data imbedded or communicated in conjunction with the data flows. Embodiments may include sessions that originate or terminate at an in-vehicle communication device. The systems may receive in-vehicle device data flow identification parameters from a vehicle device. The vehicle device is configured for identifying and associating packet data flows or sessions based on particular data session characteristics.

Additionally, the systems and methods may provide an extended header based on IPv6 that is combined with a unique message structure, such as RADIUS VSA, which allows any entity to define unique messages for any two network nodes. A client router may send messages back and forth between network nodes with the extended headers, each extended header "attached" to the flow it belongs with.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 12, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
    receiving, at a network device, one or more packet data flows from a vehicle routing device, wherein the vehicle routing device is configured to:
        identify, at the vehicle routing device in a vehicle, the one or more packet data flows based on at least one application running on at least one vehicle client device, wherein the one or more packet data flows are flowing over a communication link between the vehicle routing device and the at least one vehicle client device,
        identify each packet of each flow according to the application, of the at least one application, that sends or receives packets related to each of the one or more packet data flows,
        determine values for fields of an extended header for the one or more packet data flows, wherein a format of the extended header is based on an Internet protocol version 6 (IPv6) extension header and a RADIUS vendor specific attributes (VSA) structure, and wherein the fields include a flag field, a ticket field, a company identifier (ID) field, a sub command ID field, a command string field, a type code field, a length field, and an opaque data field, and transmit, by the vehicle routing device, to the network device remote from the vehicle, the extended header, corresponding to each of the one or more packet data flows, and the one or more packet data flows; and processing, by the network device, the one or more packet data flows based on the extended header.

2. The computer-implemented method of claim 1, wherein the transmitting, by the vehicle routing device, to the network device further comprises:

determining a routing table for the one or more packet data flows based on the extended header associated with the one or more packet data flows.

3. The computer-implemented method of claim 1, further comprising:

performing, by the network device, network address translation to route the one or more packet data flows between the vehicle routing device and the network device.

4. The computer-implemented method of claim 1, wherein the transmitting, by the vehicle routing device, to the network device further comprises:

transmitting the one or more packet data flows via one of transmission control protocol (TCP) or user datagram protocol (UDP).

5. The computer-implemented method of claim 1, further comprising:

receiving, by the network device, an indication that a new data flow consuming service is requesting access via the vehicle routing device; and sending, by the network device, a request for provisioning associated with the new data flow consuming service to an associated provisioning device.

6. The computer-implemented method of claim 5, wherein the sending, by the network device, the request for provisioning further comprises:

selecting, by the network device, prospective provisioning parameters for at least one data flow associated with the new data flow consuming service, wherein the provisioning parameters include at least one new billing identifier; and sending, by the network device, the prospective provisioning parameters to the associated provisioning device.

7. The computer-implemented method of claim 1, wherein the vehicle routing device is a vehicle telematics control unit and the at least one vehicle client device includes at least one of a navigation unit, a Wi-Fi device, a radio device, or an engine computing device.

8. The computer-implemented method of claim 1, wherein the processing the one or more packet data flows is included in a loop that includes receiving, the processing, correcting, forwarding, and notifying based on the extended header.

9. The computer-implemented method of claim 8, further comprising:

determining, by the network device, that the one or more packet data flows do not include the extended header; and processing, by the network device, the one or more packet flows based on normal procedures.

10. The computer-implemented method of claim 8, further comprising:

determining that the one or more packet data flows include the extended header; and completing the loop based on the extended header.

11. A client routing device in a vehicle, comprising:

a memory to store a plurality of instructions; and a processor configured to execute instructions in the memory to:

identify one or more packet data flows based on at least one user application running on at least one vehicle client device, wherein the one or more packet data flows are flowing over a communication link between the client routing device and the at least one vehicle client device;

identify each packet of each flow according to the user application, of the at least one user application, that sends or receives packets related to each of the one or more packet data flows;

determine values for fields of an extended header for the one or more packet data flows, wherein a format of the extended header is based on an Internet protocol version 6 (IPv6) extension header and a RADIUS vendor specific attributes (VSA) structure, and wherein the fields include a flag field, a ticket field, a company identifier (ID) field, a sub command ID field, a command string field, a type code field, a length field, and an opaque data field; and transmit to a network device, remote from the vehicle, the extended header corresponding to each of the one or more packet data flows.

12. The client routing device of claim 11, wherein, when transmitting to the network device, the processor is further configured to:

determine a routing table for the one or more packet data flows based on the extended header associated with the one or more packet data flows.

13. The client routing device of claim 11, wherein the processor is further configured to:

perform network address translation to route the one or more packet data flows between the at least one vehicle client device and the network device.

14. The client routing device of claim 11, wherein, when transmitting to the network device, the processor is further configured to:

transmit the one or more packet data flows via one of transmission control protocol (TCP) or user datagram protocol (UDP).

15. The client routing device of claim 11, wherein the processor is further configured to:

receive an indication that a new data flow consuming service is requesting access via the client routing device; and send a request for provisioning associated with the new data flow consuming service to an associated provisioning device.

16. The client routing device of claim 11, wherein the client routing device is a vehicle telematics control unit and the at least one vehicle client device includes at least one of a navigation unit, a Wi-Fi device, a radio device, or an engine computing device.

17. A non-transitory computer-readable medium including instructions to be executed by a processor, the instructions including one or more instructions, when executed by the processor, for causing the processor to:

identify one or more packet data flows based on at least one user application running on at least one vehicle client device, wherein the one or more packet data flows are flowing over a communication link between a client routing device and the at least one vehicle client device;

identify each packet of each flow according to the user application, of the at least one user application, that sends or receives packets related to each of the one or more packet data flows;

determine values for fields of an extended header for the one or more packet data flows, wherein a format of the extended header is based on an Internet protocol version 6 (IPv6) extension header and a RADIUS vendor specific attributes (VSA) structure, and wherein the fields include a flag field, a ticket field, a company identifier (ID) field, a sub command ID field, a command string field, a type code field, a length field, and an opaque data field; and transmit to a network device, remote from a vehicle, the extended header, corresponding to each of the one or more packet data flows, and the one or more packet data flows.

18. The non-transitory computer-readable medium of claim 17, wherein the one or more instructions for causing the processor to transmit to the network device the extended header further comprise one or more instructions for causing the processor to determine a routing table for the one or more packet data flows based on the extended header associated with the one or more packet data flows.

19. The non-transitory computer-readable medium of claim 17, wherein the instructions further include one or more instructions for causing the processor to:

perform network address translation to route the one or more packet data flows between the at least one vehicle client device and the network device.

* * * * *